Figure 1:
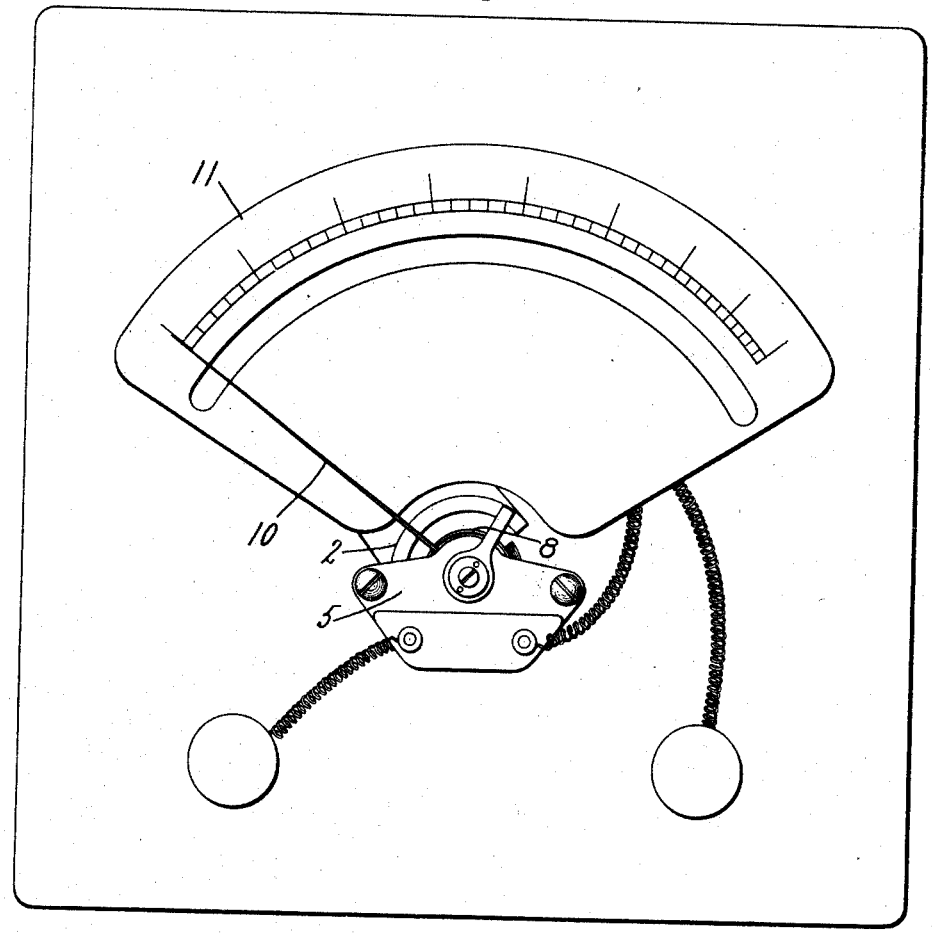

E. THOMSON.
ELECTRIC MEASURING INSTRUMENT.
APPLICATION FILED NOV. 13, 1907.

927,191.

Patented July 6, 1909.
2 SHEETS—SHEET 1.

Witnesses:
George W. Tilden
J. Ellis Glen

Inventor:
Elihu Thomson,
by Albert G. Davis
Att'y.

E. THOMSON.
ELECTRIC MEASURING INSTRUMENT.
APPLICATION FILED NOV. 13, 1907.
927,191.
Patented July 6, 1909.
2 SHEETS—SHEET 2.
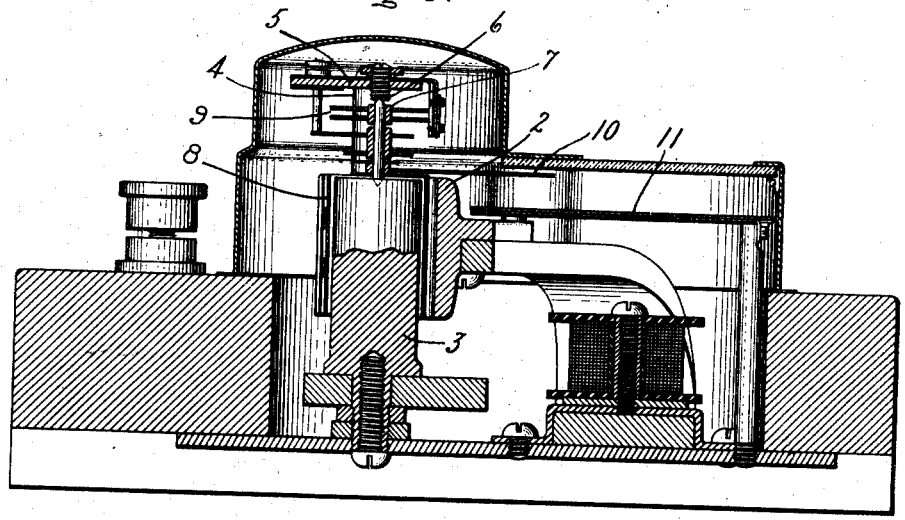
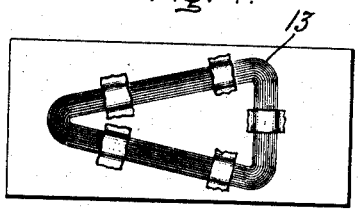
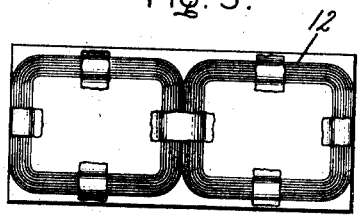
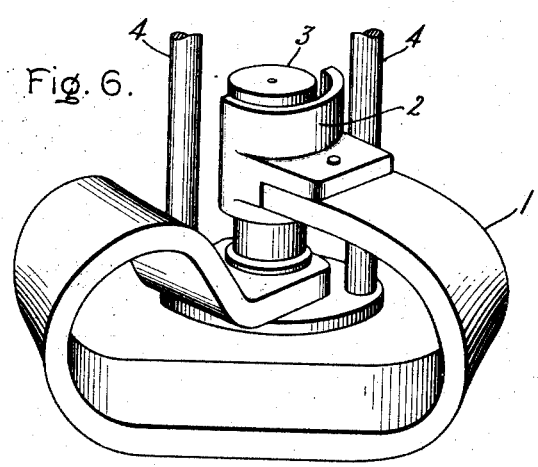
Witnesses:
George W. Tilden
J. Ellis Glen
Inventor:
Elihu Thomson,
by Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC MEASURING INSTRUMENT.

No. 927,191.      Specification of Letters Patent.      Patented July 6, 1909.

Application filed November 13, 1907. Serial No. 401,948.

*To all whom it may concern:*

Be it known that I, ELIHU THOMSON, a citizen of the United States, residing at Swampscott, county of Essex, State of Massachusetts, have invented certain new and useful Improvements in Electric Measuring Instruments, of which the following is a specification.

My invention relates to electric measuring instruments and more particularly to indicating instruments comprising a permanent magnet with a moving current carrying coil mounted to move in the field of the magnet and having a pointer movable over a scale to show the extent of movement of the coil.

It is desirable that an indicating instrument have a long open scale with practically uniform subdivisions so that the instrument may be easily read, and it is also often desirable that the instrument be more sensitive at predetermined parts of the scale than at the other parts, or in other words, that the scale be unusually open. In the usual types of instrument the scale is about 90° in extent, which causes the scale divisions to be so small that it is difficult to read the instrument, and the scale cannot be made open at any desired point.

The object of my invention is to provide an instrument having a long scale with uniform divisions and which may, if desired, be made abnormally sensitive to any arbitrarily selected point or points of the scale so that the scale may be opened out whenever desired.

In carrying out my invention the current carrying coil which is preferably flat and mounted to move edgewise through the field maintained by the permanent magnet, is so shaped that equal movements in any part of its path cause equal changes in the number of lines of force included by it, thereby producing a scale which is uniform from end to end. If the field produced by the magnet is uniform a rectangular coil with straight sides mounted to move edgewise in the field gives a scale which is practically uniform, but is comparatively short, since where the coils move about a pivot as a center so that the scale is circular, two rectangular coils must be mounted upon the periphery of a support rotatable about the pivot and as each coil occupies about half the periphery, the scale becomes less than a semicircle in extent. The scale may be made to extend through nearly a complete circle by arranging the field and the coil in such relation to each other, preferably by properly shaping either the field or the coil, that the coil progressively includes more and more lines of force as it turns through nearly a complete circle, while in the usual type of instrument the coil has included the maximum number of lines by the time it has turned through about 90°. The desired result may be attained by making the coil triangular and mounting it to move along a line from the apex to the base of the triangle into a magnetic field which extends through only a fraction of the arc of movement of the coil. The magnet preferably has concentric pole pieces and the coils are shaped so as to move bodily edgewise into or out of the intense and uniform field existing in the annular gap between the pole pieces.

The scale of the instrument may be opened at any selected point or points by changing the shape of the moving coil so that the number of lines of force included by the coil changes arbitrarily as the coil moves and bears no fixed or definite relation to the extent so that the scale may be opened out at one or several different points.

One of the various forms in which my invention may be embodied is shown in the accompanying drawings, in which—

Figure 2:
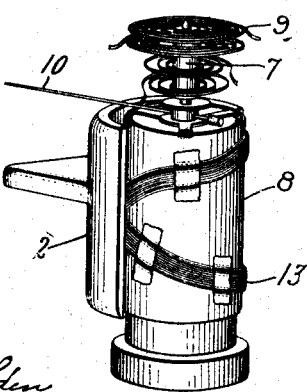
Figure 7:
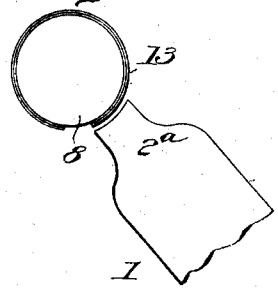

Figure 1 is a plan view of a measuring instrument; Fig. 2 a perspective view of the moving coil and support of the instrument shown in Fig. 1; Fig. 3 a sectional view of the instrument shown in Fig. 1; Fig. 4 is a developed view of one form of current carrying coil; Fig. 5 a developed view of another form of current carrying coil; Fig. 6 a view of the magnetic system of the instrument; and Fig. 7 is a plan view of the pole piece and coil of the form of instrument having a very long scale.

The instrument shown in the drawings comprises a base for carrying the moving parts and a cover of any suitable form secured to the base. The current is led to the instrument through terminals of any suitable form mounted on the base and through a compensating resistance such as is commonly used in connection with measuring instruments of this type.

The permanent magnet 1 of the instrument is preferably arranged to produce a uniform field of force and in the instrument illustrated is bent to the form shown in Fig. 6. The magnet has a semicircular pole piece 2 extending through about 180° and a cylindrical pole piece 3 concentric with the circular pole piece and separated from it by an annular air gap in which exists an intense and uniform magnetic field of an extent dependent on the length of the pole piece 2. The moving parts of the instrument are supported in proper relation to the magnet by means of pedestals 4 secured to the magnet and carrying a cross-piece 5 which is provided with a bearing 6 for the upper end of an arbor or pivot 7 which is mounted concentric with the axis of the pole piece 3 and has its lower end mounted in a suitable bearing on the upper end of said pole piece. The arbor or pivot 7 carries a cylindrical support or spool 8 mounted concentric with the pole piece 3 to move in the annular air-gap between the pole pieces. The support or spool 8 is made of aluminum or similar material and acts as a support for the current carrying coil and also to damp the movement of the coil and render the instrument deadbeat. The extent of the movement of the support or spool 8 is regulated by a restraining spring 9 of any well known form with one end attached to the arbor 7 and the other end to a stationary member secured to the cross-piece 5. The extent of the movement of the support 8 is indicated by means of a pointer 10 movable over a scale plate 11.

The current carrying coil of the instrument is mounted upon and secured to the support or spool 8 and is preferably wound flat and mounted upon the support so as to have a bodily edgewise movement through the uniform field in the gap between the poles. The preferred form of coil for a uniform scale of measurement is rectangular, two coils being mounted on the support 8 in the manner shown in Fig. 5 so as to move edgewise between the poles of the magnet 1 and coöperates in turning the support 8. With this arrangement, however, the scale is somewhat less than 180° though uniform from end to end. When the instrument is required to have a long scale, a triangular coil 13 of the form shown in Fig. 4 is mounted upon the cylindrical support or spool to move through a very narrow field secured by the use of a very narrow pole piece 2ª, as shown in Fig. 7, instead of the semi-circular pole piece 2 and a scale of nearly 360 degrees may be secured since the triangular coil can be arranged to practically encircle the support, and in moving into and out of the narrow field will rotate the support nearly a complete revolution. When the pole piece is made wider, as shown in Figs. 2, 3 and 6, and produces practically a semi-circular field, the triangular coil will have a movement of about 180°. The coil is mounted as shown in Fig. 2 so as to be movable along a line from the apex to the base of the coil with the straight sides of the coil forming an angle with the plane of movement of the coil. With this construction the coil cuts the lines of force at a uniform rate and may be arranged with the apex just entering the field at zero position so as to be drawn into the field of force by the small end or else to be completely immersed in the field of force at the zero position and to be forced out of the field when current flows through the coil.

With the forms of coil above described the number of lines of force included in any position varies directly as the extent of movement of the coil and the scale is uniform, but the shape of the moving coil may be varied in any arbitrary way to open out the scale as desired. The coils may be given any desired form to secure this result but preferably the triangular coil is made with wavy or crooked sides.

My invention may be embodied in many other forms than that shown and described and I, therefore, do not wish to be restricted to the precise form disclosed but intend to cover by the appended claims all changes and modifications within the spirit and scope of my invention.

What I claim as new and desire to secure by Letters Patent of the United States, is,—

1. An electric measuring instrument comprising means for producing a magnetic field, a rotatable support, and a current carrying coil mounted on said support, said field and said coil being shaped relatively to each other to cause the number of lines of force included by the coil to vary progressively during a substantially complete rotation of said support.

2. An electric measuring instrument comprising means for producing a magnetic field, a rotatable support and a flat current carrying coil mounted on said support in such relation to the field that the number of lines of force included by the coil varies progressively during a complete rotation of the support.

3. An electric measuring instrument comprising means for producing a magnetic field and a current carrying coil rotatably mounted in said field, said coil and field being of dissimilar shape and so related that the coil includes a progressively increasing flux within the coil throughout substantially a complete rotation of the support.

4. In a measuring instrument, the combination with means for producing a magnetic field of uniform density, of a triangular current carrying coil mounted for bodily edgewise movement in said field along a line from the apex to the base of the triangle.

5. In a measuring instrument, the combination with means for producing a magnetic field, of a triangular coil mounted for bodily translation edgewise through said field along a line from the apex to the base of said coil and longer in the direction of its movement than the extent of said field in said direction, and an indicator connected to said coil.

6. In a measuring instrument, the combination with means for producing a uniform magnetic field extending through a definite angular distance about a center, of a current carrying coil extending through a greater angular distance than said field mounted for bodily movement edgewise about said center and tapering to include more lines of force as the range of deflection increases.

7. In a measuring instrument, the combination with means for producing a magnetic field of definite width, of a triangular current carrying coil mounted to move edgewise in the magnetic field along a line from the apex to the base of the coil and having a length in the direction of movement greater than the width of the field.

8. In a measuring instrument, the combination with means for producing a uniform magnetic field, of a coil formed as an isosceles triangle and mounted for bodily edgewise movement at right angles to the base.

9. In an indicating instrument, the combination with a magnet having concentric pole pieces, of a flat coil bent to form a portion of a hollow cylinder concentric with said pole pieces and mounted to move edgewise between said pole pieces, and a controlling spring connected to said coil to normally hold it with one edge within said field and the remainder of the coil outside said field, whereby said coil includes more lines of force as it moves against said spring.

10. In an indicating instrument, the combination with a magnet having concentric pole pieces, of a cylindrical support mounted concentric with and to move between said pole pieces, a flat current carrying coil fitted to the surface of said support to move between said pole pieces, a control spring connected to said coil to normally hold it with one edge within said field and the remainder of the coil outside said field, whereby said coil includes more lines of force as it moves against said spring.

11. In a measuring instrument, the combination with a magnet having concentric pole pieces, of a cylindrical support pivoted concentrically with said pole pieces, and a triangular coil shaped to fit and attached to the surface of said support to move between said pole pieces.

In witness whereof, I have hereunto set my hand this eleventh day of Nov., 1907.

ELIHU THOMSON.

Witnesses:
JOHN A. McMANUS, Jr.,
A. F. MACDONALD.